US011543912B2

(12) United States Patent
Chen et al.

(10) Patent No.: US 11,543,912 B2
(45) Date of Patent: Jan. 3, 2023

(54) TOUCH DETECTION METHOD AND TOUCH DISPLAY DEVICE

(71) Applicant: NOVATEK Microelectronics Corp., Hsinchu (TW)

(72) Inventors: Hsiang-Ting Chen, Hsinchu County (TW); Yun-Hsiang Yeh, Hsinchu County (TW); Yen-Heng Chen, Hsinchu County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 17/140,124

(22) Filed: Jan. 3, 2021

(65) Prior Publication Data

US 2021/0333974 A1    Oct. 28, 2021

Related U.S. Application Data

(60) Provisional application No. 63/016,305, filed on Apr. 28, 2020.

(51) Int. Cl.
*G06F 3/041* (2006.01)

(52) U.S. Cl.
CPC ...... *G06F 3/04166* (2019.05); *G06F 3/04184* (2019.05)

(58) Field of Classification Search
CPC ............ G06F 3/04164; G06F 3/04166; G06F 3/04184
See application file for complete search history.

(56) References Cited

U.S. PATENT DOCUMENTS

| 2014/0247236 A1* | 9/2014 | Olivier | G06F 3/045 345/173 |
| 2017/0344174 A1* | 11/2017 | Pant | G06F 3/0446 |
| 2018/0164915 A1* | 6/2018 | Karpin | G06V 40/1376 |
| 2019/0294310 A1* | 9/2019 | Lee | G09G 3/2088 |
| 2020/0218420 A1* | 7/2020 | Feng | G06F 3/04166 |

\* cited by examiner

*Primary Examiner* — Afroza Chowdhury
(74) *Attorney, Agent, or Firm* — CKC & Partners Co., LLC

(57) ABSTRACT

A touch detection method, suitable for a touch display panel including multiple sensing pads, is disclosed. The sensing pads are divided into groups and each of the groups includes at least two columns of the sensing pads. The touch detection method includes following steps. In a first mode, the sensing pads are scanned group-by-group for detecting whether a touch event occurs on a touch identified group. In a second mode, the sensing pads are scanned column-by-column to identify a touch position of the touch event.

17 Claims, 7 Drawing Sheets

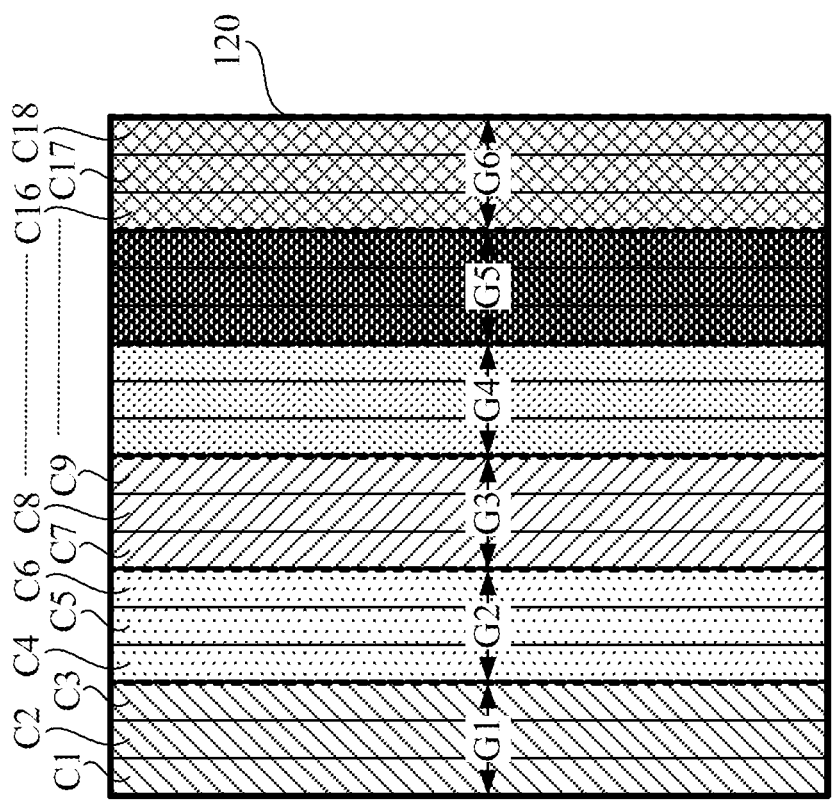
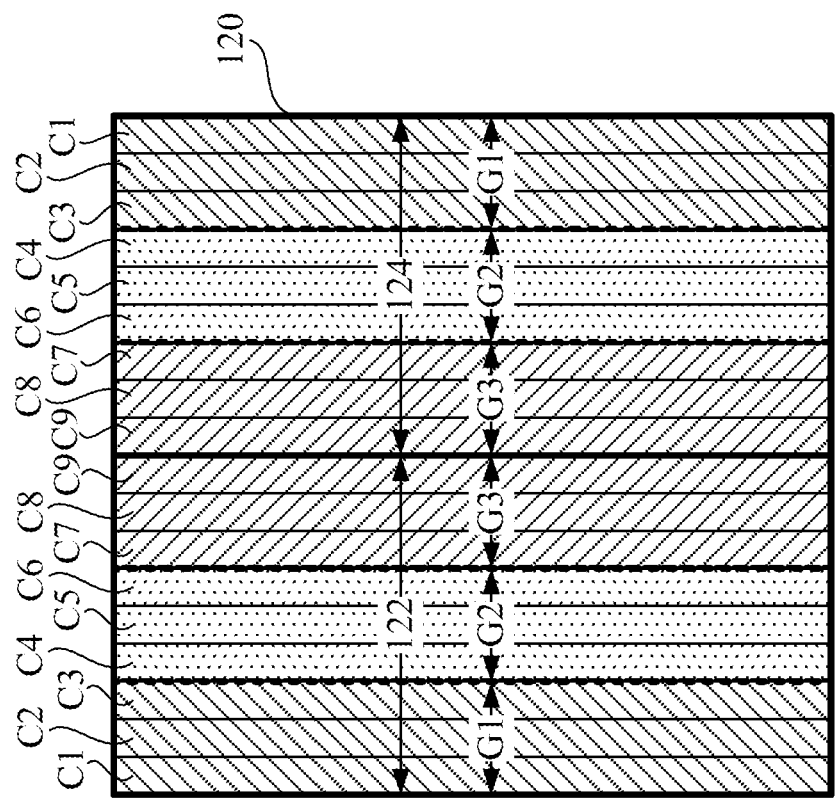
FIG. 2B
FIG. 2A

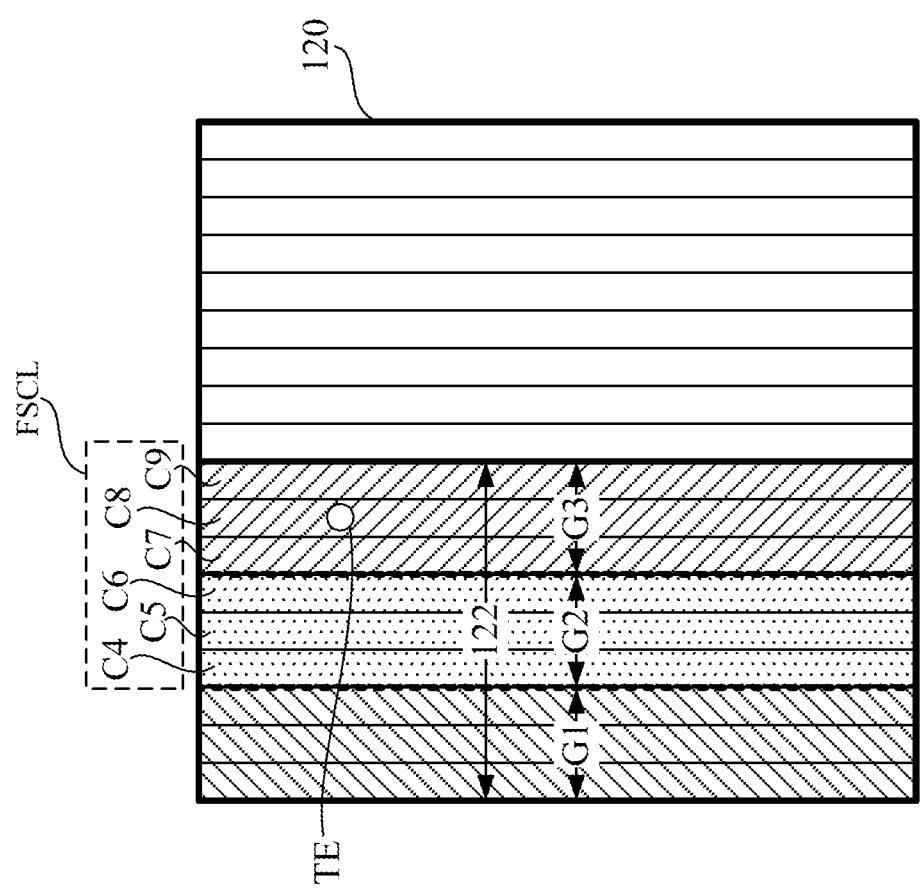

TOUCH DETECTION METHOD AND TOUCH DISPLAY DEVICE

RELATED APPLICATIONS

This application claims priority to U.S. Provisional Application Ser. No. 63/016,305, filed Apr. 28, 2020, which is herein incorporated by reference.

BACKGROUND

Field of Invention

The disclosure relates to a touch detection method and a touch display device. More particularly, the disclosure relates to a touch detection method capable of reducing a touch detection latency related to an incoming touch event.

Description of Related Art

Touch display panels have been widely used in a variety of electronic devices in modern technology, such as smart phone, tablet computer, smart television, personal computer, and so on. A conventional touch display panel required a display driver for displaying function and a touch driver for touch detection function. With the development of touch and display driver Integration (TDDI) technology, touch and display functions may be integrated in one chip to drive a touch display panel which is a display panel with integrated touch sensing capability. The TDDI technology may provide advantages including cost reduction, a thinner touch display panel, and better performance.

SUMMARY

The disclosure provides a touch detection method, which is suitable for a touch display panel including a plurality of sensing pads. The sensing pads are divided into groups and each group includes at least two columns of the sensing pads. The touch detection method includes following steps. In a first mode, the sensing pads are scanned group-by-group for detecting whether a touch event occurs on a touch identified group. In a second mode, the sensing pads are scanned column-by-column to identify a touch position of the touch event.

The disclosure also provides a touch display device, which includes a touch display panel and a driving circuit. The touch display panel includes a sensing pads arranged on columns. The sensing pads are divided into groups and each group includes at least two columns of the sensing pads. The driving circuit is coupled with the touch display panel. In a first mode, the driving circuit is configured to scan the sensing pads group-by-group for detecting whether a touch event occurs on a touch identified group. In a second mode, the driving circuit is configured to scan the sensing pads column-by-column to identify a touch position of the touch event.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 2A, which is a schematic diagram illustrating a touch display panel in FIG. 1 according to an embodiment of the disclosure.

FIG. 2B is a schematic diagram illustrating another embodiment of the touch display panel in FIG. 1 according to an embodiment of the disclosure.

FIG. 7 is a schematic chart diagram illustrating a position of a touch event and a corresponding set of fast scan columns according to the another demonstrational example.

DETAILED DESCRIPTION

Figure 1:
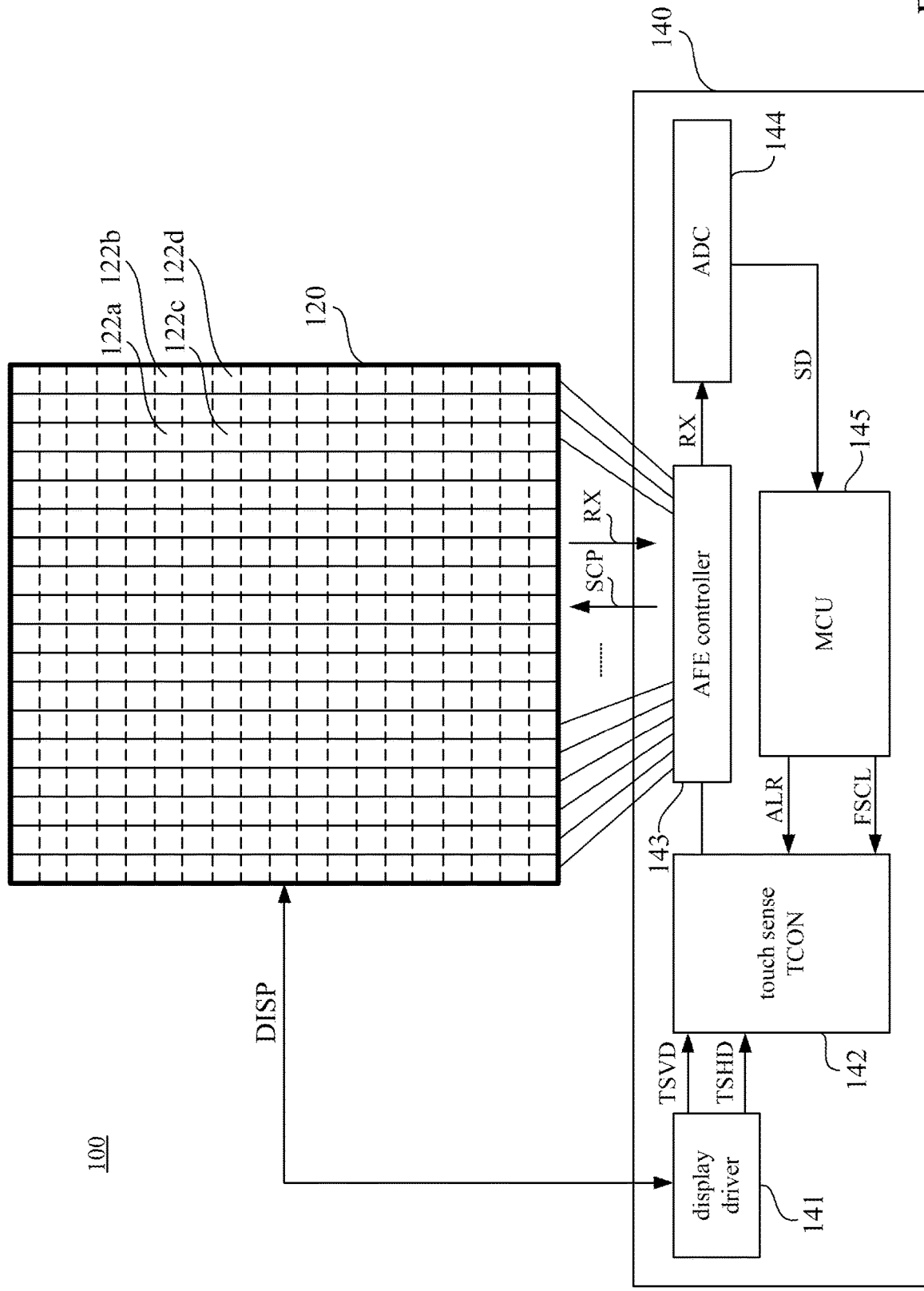
FIG. 1 is a schematic diagram illustrating a touch display device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating a touch display device 100 according to an embodiment of the disclosure. The touch display device 100 includes a touch display panel 120 and a driving circuit 140. The driving circuit 140 is coupled with the touch display panel 120. In some embodiments, the driving circuit 140 is a touch and display driver integration (TDDI) circuit, and the driving circuit 140 is configured to control functions of displaying and touch sensing on the touch display panel 120.

The touch display panel 120 includes several sensing pads, such as the sensing pads 122a~122d as shown in FIG. 1. The sensing pads on the touch display panel 120 are individually arranged along rows and columns for sensing a touch event on the touch display panel 120. In the embodiment shown in FIG. 1, the sensing pads 122a and 122b are both arranged on one row, and the sensing pads 122c and 122d are both arranged on another row different from the sensing pads 122a and 122b. The sensing pads 122a and 122c are both arranged on one column, and the sensing pads 122b and 122d are both arranged on another column different from the sensing pads 122a and 122c. For brevity, the sensing pads 122a~122d are discussed for demonstration. In practical applications, the touch display panel 120 includes sensing pads arranged on multiple rows and multiple columns.

In some embodiments, the driving circuit 140 is able to perform the touch sensing function on the touch display panel 120 in at least two different modes, which include a doze mode and an active mode. In the doze mode, the driving circuit 140 is configured to scan the touch display panel 120 with a lower resolution or with a lower frequency, so as to reduce a power consumption of the touch display device 100. In the doze mode, the driving circuit 140 is not required to detect a precise position of a touch event, and the driving circuit 140 is utilized to detect whether there is a touch event or not. If no touch event is detected, the driving circuit 140 remains in the doze mode. Once if the touch event is detected, the driving circuit 140 switches from the doze mode into the active mode, to scan the touch display panel 120 with a higher resolution or with a higher frequency. In the active mode, the driving circuit 140 is utilized to detect the precise position of the touch event. More details about how the driving circuit 140 operates in the doze mode and in the active mode are explained in following paragraphs.

As the embodiment illustrated in FIG. 1, the driving circuit 140 includes a display driver 141, a touch sense time controller (TCON) 142, an analog front-end (AFE) controller 143, an analog digital converter (ADC) 144 and a microcontroller unit (MCU) 145. In some embodiments, the display driver 141 is utilized to control the function of displaying on the touch display panel 120. For example, the display driver 141 is utilized to provide display data DISP and corresponding display control signals (not shown in figures) to the touch display panel 120, and a screen on the touch display panel 120 can display according to the display data DISP (such as brightness values, RGB values, grey levels or display-related configurations). In some embodiments, the touch sense time controller (TCON) 142, the analog front-end (AFE) controller 143, the analog digital converter (ADC) 144 and the microcontroller unit (MCU) 145 in the driving circuit 140 are utilized to control the function of touch sensing on the touch display panel 120. In order to make sure that the functions of displaying and the touch sensing are performed in synchronized timing on the touch display panel 120, the display driver 141 provides timing signals (which include a frame synchronization signal TSVD and a horizontal synchronization signal TSHD) to the touch sense time controller 142. In some embodiments, the frame synchronization signal TSVD is configured to define a persisting period of one touch-sensing frame. On the other hand, the horizontal synchronization signal TSHD is configured to define a persisting period of one scan pulse and to determine an amount of scan pulses within one touch-sensing frame.

According to the frame synchronization signal TSVD and the horizontal synchronization signal TSHD from the display driver 141, the touch sense time controller 142 is configured to trigger the analog front-end controller 143 to generate scan pulses SCP to the touch display panel 120 in reference with the frame synchronization signal and the horizontal synchronization signal. The analog front-end controller is 143 coupled with each of columns of the touch display panel 120. The analog front-end controller 143 is configured to generate the scan pulses SCP to the columns on the touch display panel 120, and the analog front-end controller 143 is configured to collect analog sensing signals RX from the columns on the touch display panel 120 corresponding to the scan pulses SCP. The analog digital converter 144 is coupled with the analog front-end controller 143. The analog digital converter 144 is configured to convert the analog sensing signals RX into scan data SD corresponding to the columns on the touch display panel 120. The microcontroller unit 145 is coupled with the analog digital converter 144. The microcontroller unit 145 is configured to detect a touch event on the touch display panel 120 according to the scan data SD and calculate and identify the touch position of the touch event according to the scan data SD.

In some embodiments, when the touch event occurs on a specific position of the touch display panel 120, a capacitance value or a resistance value on the specific position of the touch display panel 120 will vary due to the touch event, such that a voltage level or a current amplitude of one analog sensing signal RX corresponding to the specific position will be different from a standard value (when there is no touch event). The scan data SD generated corresponding to the specific position are able to reflect the variance of capacitance/resistance on the specific position of the touch display panel 120. The microcontroller unit 145 is configured to perform a touch sensing algorithm on the scan data SD to detect whether the touch event occurs on the touch display panel 120, and the microcontroller unit 145 is also configured to perform the touch sensing algorithm to detect the specific position corresponding to the touch event.

Reference is further made to FIG. 2A, which is a schematic diagram illustrating a touch display panel 120 in FIG. 1 according to an embodiment of the disclosure. As shown in FIG. 2A in some embodiments, the touch display panel 120 includes two active regions 122 and 124. The active region 122 is located on the left side of the touch display panel 120 and the active region 124 is located on the right side of the touch display panel 120. The active regions 122 and 124 are driven to display and to perform touch detection synchronously.

In some embodiments, the active regions 122 and 124 are driven by the driving circuit 140 at the same times. The driving circuit 140 is able to perform functions of displaying and touch sensing on both of the active regions 122 and 124 synchronously. In some embodiments, the active regions 122 and 124 are driven by two different sets of driving circuits 140 respectively (FIG. 1 only illustrates one driving circuit 140). For brevity, FIG. 1 illustrates one set of the driving circuits 140 for driving the active regions 122 and 124.

As shown in FIG. 2A, the active regions 122 includes nine columns C1, C2, C3, C4, C5, C6, C7, C8 and C9 of the sensing pads, and the active regions 124 includes another nine columns C1, C2, C3, C4, C5, C6, C7, C8 and C9 of the sensing pads. In other words, the touch display panel 120 illustratively shown in FIG. 2A includes eighteen columns. Each of the columns includes multiple sensing pads (e.g., the sensing pads 122a~122d as shown in FIG. 1) located on the one column. The columns C1~C9 of the sensing pads in the active region 122 are divided into three groups G1, G2 and G3. Each of the groups G1~G3 includes at least two of the columns. In the embodiments, each of the group G1~G3 includes three columns. For example, the group G1 include the columns C1~C3 of the sensing pads; the group G2 include the columns C4~C6 of the sensing pads; the group G3 include the columns C7~C9 of the sensing pads.

However, the disclosure is not limited to 18 columns located on two active regions, 3 groups in each active region and 3 columns in each group as shown in FIG. 2A. In practical applications, the touch display panel 120 may include different amounts of columns such as 6, 12, 18, 24 or more columns. The columns C1~C18 shown in FIG. 2A are columns utilized for touch sensing. In some embodiments, the touch display panel 120 further includes 360, 480, 720, 1024 or 2048 pixel columns (not shown in FIG. 2A) for image displaying. The image displaying function of the touch display panel 120 is known by a skilled person in the art and not discussed in this disclosure. In some embodiments of this disclosure, the columns can be divided into more groups and each of the groups can include more columns. For example, for the touch display panel 120 with 240 columns, these 240 columns can be located on two active regions; each active regions includes 10 groups; and each group includes 12 columns. Therefore, the disclosure is not limited to a specific amount of the columns included in group. In other words, each of the groups can includes K columns, and K is a positive integer larger than or equal to 2.

Reference is further made to FIG. 2B, which is a schematic diagram illustrating another embodiment of the touch display panel 120 in FIG. 1 according to an embodiment of the disclosure. In the embodiments shown in FIG. 2B, the touch display panel 120 includes 18 columns C1~C18, which are divided into six groups G1~G6, and each of the groups G1~G6 includes three columns. For example, the group G1 include the columns C1~C3; the group G2 include the columns C4~C6; the group G3 include the columns C7~C9; the group G6 include the columns C16~C18. Compared to embodiments shown in FIG. 2A, the touch display panel 120 shown in FIG. 2B is not divided into two active regions 122 and 124. These 18 columns C1~C18 on the touch display panel 120 shown in FIG. 2B are regarded in the same active region and directly divided into the groups G1~G6.

For brevity, the disclosure utilizes the embodiment as shown in FIG. 2A with 18 columns located on two active regions 122 and 124, 3 groups in each active region and 3 columns in each group for demonstration.

Figure 3:
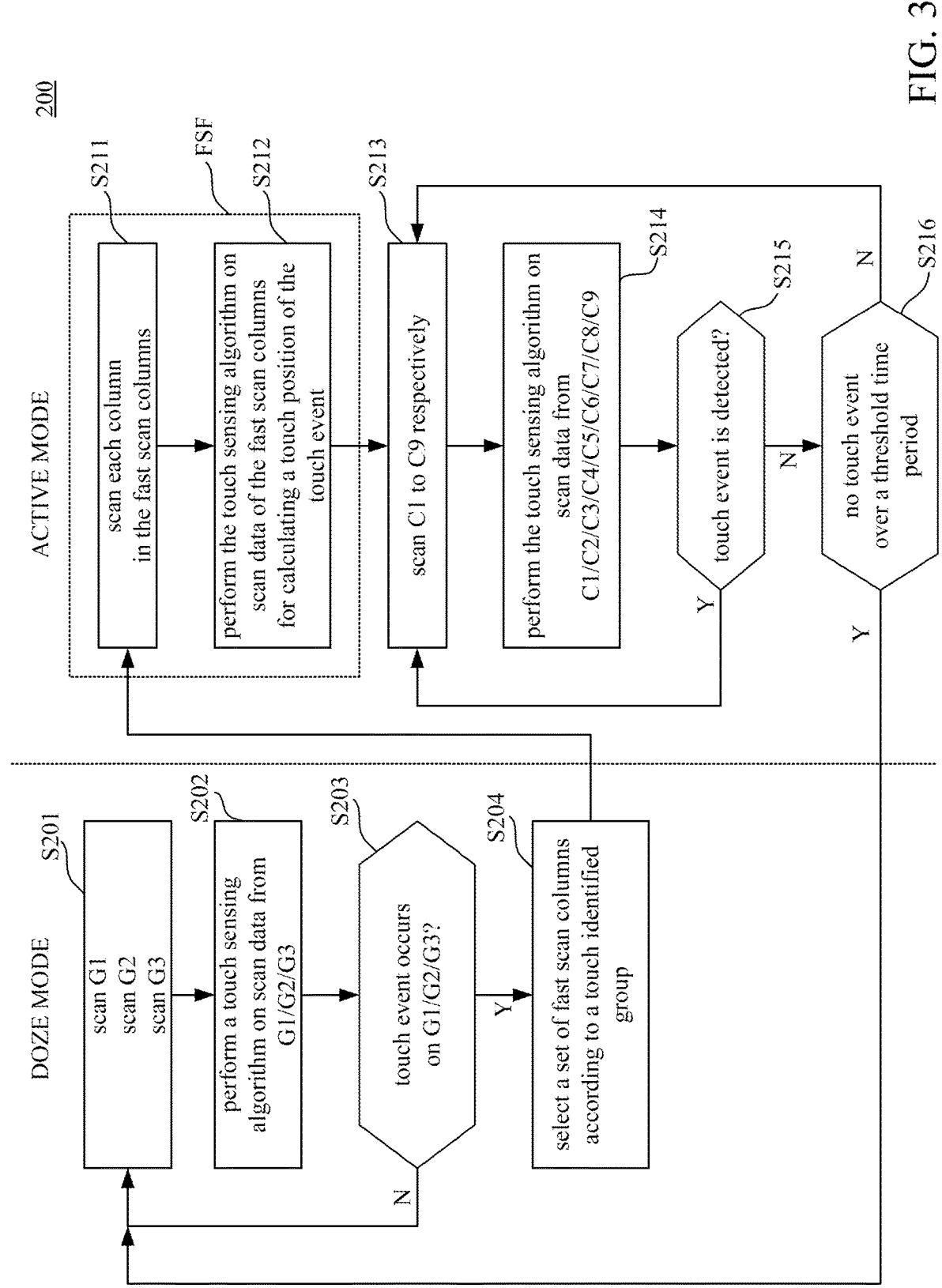
FIG. 3 is a flow chart diagram illustrating a touch detection method according to an embodiment of the disclosure.
Figure 4:
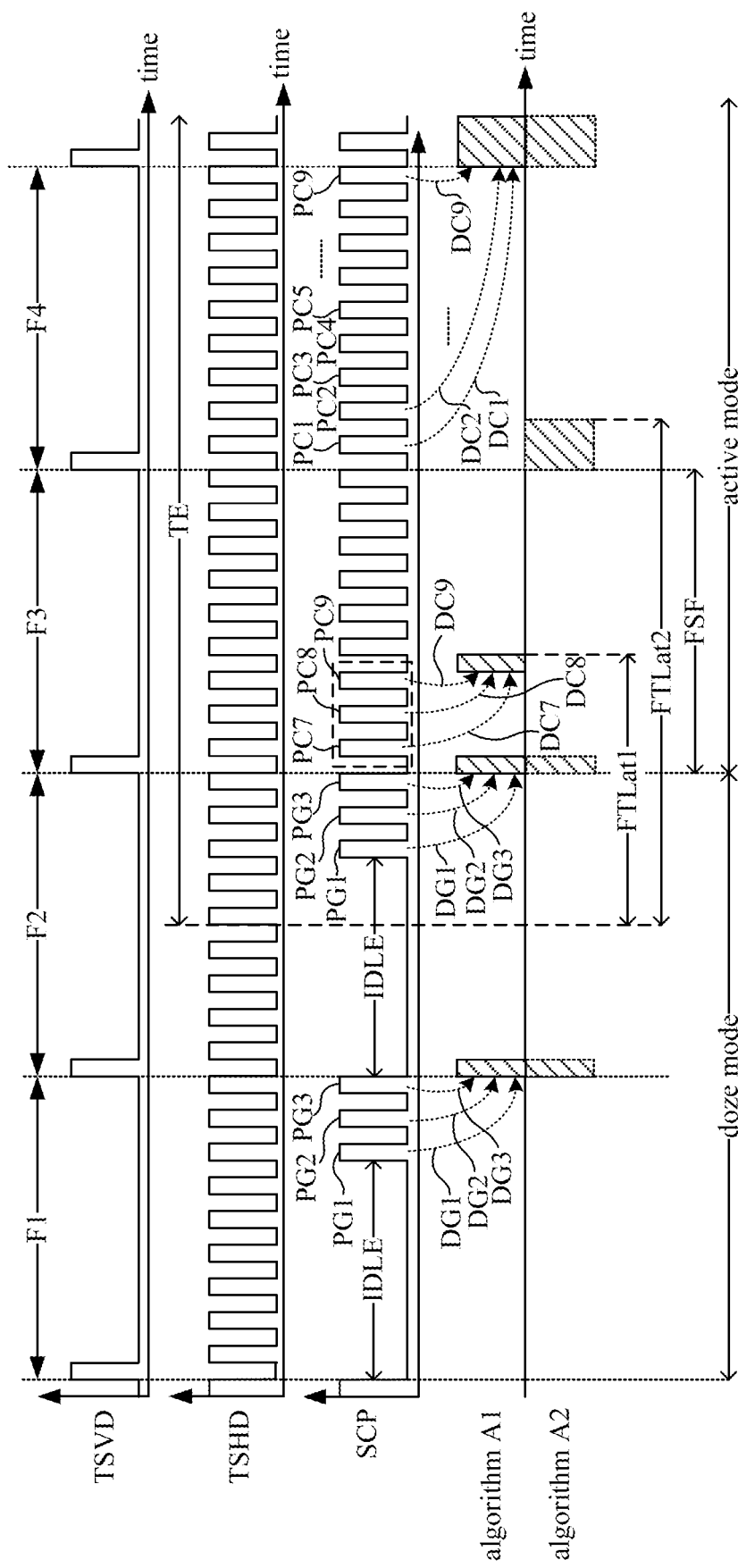
FIG. 4 is a signal waveform diagram illustrating related signals of the touch display device while performing the touch detection method.

In the doze mode, the driving circuit 140 is configured to scan the columns C1~C9 in FIG. 2A in a way of group-by-group for detecting whether a touch event occurs on the touch display panel 120. In the active mode, the driving circuit 140 is configured to scan the columns C1~C9 in FIG. 2A in a way of column-by-column for calculating a touch position of the touch event. Reference is further made to FIG. 3, which is a flow chart diagram illustrating a touch detection method 200 according to an embodiment of the disclosure. The touch detection method 200 is suitable to be used on the touch display device 100 in FIG. 1. Reference is further made to FIG. 4, which is a signal waveform diagram illustrating related signals of the touch display device 100 while performing the touch detection method 200.

Referring to FIG. 1, FIG. 2A, FIG. 3 and FIG. 4, in the doze mode, the touch detection method 200 performs step S201 to scan the groups G1~G3 in the touch display panel 120 one group after another group. As shown in FIG. 4, the touch display device 100 and the touch detection method 200 are in the doze mode during the touch frames F1 and F2. The frame synchronization signal TSVD is configured to define the persisting period of these touch frames F1~F4. The horizontal synchronization signal TSHD is configured to determine maximum amount of scan pulses within one touch frame F1~F4.

As shown in FIG. 1, FIG. 2A, FIG. 3 and FIG. 4, during the touch frame F1 in the doze mode, the analog front-end controller 143 generates the scan pulse PG1 simultaneously to all of the columns C1, C2 and C3 in the group G1. The analog front-end controller 143 collects the analog sensing signal ASS responsive to the scan pulse PG1 simultaneously from all of the columns C1~C3 in the group G1, and the analog digital converter 144 converts the analog sensing signal ASS into the scan data DG1, which is related to scan result on the group G1. It is noticed that the scan pulse PG1 is not provided individually to one specific column, such as C1, C2 or C3. In the embodiment, the scan pulse PG1 is provided all of the columns C1~C3 in the group G1 at the same time, and the scan data DG1 is generated according to the analog sensing signal ASS collected from all of the columns C1~C3 in the group G1 at the same time. In this case, the scan data DG1 is able to indicate whether the touch event TE occurs on the group G1, and the scan data DG1 is not able indicate that the touch event TE occurs on which column among the columns C1~C3.

Similarly, during the touch frame F1 in the doze mode, the analog front-end controller 143 generates the scan pulse PG2 simultaneously to all of the columns C4, C5 and C6 in the group G2. The analog front-end controller 143 collects the analog sensing signal ASS responsive to the scan pulse PG2 simultaneously from all of the columns C4~C6 in the group G2, and the analog digital converter 144 converts the analog sensing signal ASS into the scan data DG2, which is related to scan result on the group G2. It is noticed that the scan pulse PG2 is not provided individually to one specific column, such as C4, C5 or C6. In the embodiment, the scan pulse PG2 is provided all of the columns C4~C6 in the group G2 at the same time, and the scan data DG2 is generated according to the analog sensing signal ASS collected from all of the columns C4~C6 in the group G2 at the same time. In this case, the scan data DG2 is able to indicate whether the touch event TE occurs on the group G2, and the scan data DG2 is not able indicate that the touch event TE occurs on which column among the columns C4~C6.

Similarly, during the touch frame F1 in the doze mode, the analog front-end controller 143 generates the scan pulse PG3 simultaneously to all of the columns C7, C8 and C9 in the group G3. The analog front-end controller 143 collects the analog sensing signal ASS responsive to the scan pulse PG3 simultaneously from all of the columns C7~C9 in the group G3, and the analog digital converter 144 converts the analog sensing signal ASS into the scan data DG3, which is related to scan result on the group G3. It is noticed that the scan pulse PG3 is not provided individually to one specific column, such as C7, C8 or C9. In the embodiment, the scan pulse PG3 is provided all of the columns C7~C9 in the group G3 at the same time, and the scan data DG3 is generated according to the analog sensing signal ASS collected from all of the columns C7~C9 in the group G2 at the same time. In this case, the scan data DG3 is able to indicate whether the touch event TE occurs on the group G3, and the scan data DG3 is not able indicate that the touch event TE occurs on which column among the columns C7~C9.

As shown in FIG. 1, FIG. 2A, FIG. 3 and FIG. 4, during the touch frame F1 in the doze mode, the touch detection method 200 performs step S202, to perform the touch sensing algorithm A1 by the microcontroller unit 145 on the scan data DG1 to detect whether the touch event occurs on the group G1, to perform the touch sensing algorithm A1 by the microcontroller unit 145 on the scan data DG2 to detect whether the touch event occurs on the group G2, and to perform the touch sensing algorithm A1 by the microcontroller unit 145 on the scan data DG3 to detect whether the touch event occurs on the group G3. During the touch frame F1 in the doze mode, the touch detection method 200 performs step S203 to determine whether the touch event occurs any one of the groups G1, G2 or G3.

It is assumed that there is no touch event TE occurs during the touch frame F1. In this case, the microcontroller unit 145 generates an algorithm result ALR (which indicates that no touch event is detected) to the touch sense time controller 141. In the meantime, the touch display device 100 and the touch detection method 200 remain in the doze mode, and the touch detection method 200 returns to step S201 for the following touch frame F2.

As shown in FIG. 4, during the touch frame F1 in the doze mode, the analog front-end controller 143 does not generates the scan pulses all the time, and the analog front-end controller 143 is suspended without generating any scan pulse during a suspending period IDLE. During the suspending period IDLE, the analog front-end controller 143, the analog digital converter 144 and the microcontroller unit 145 are temporally suspended from performing the touch detection function, such that the power consumption of the driving circuit 140 can be reduced.

As shown in FIG. 1, FIG. 2A, FIG. 3 and FIG. 4, during the touch frame F2 in the doze mode, the touch detection method 200 performs step S201 again to scan the group G1, to scan the group G2 and to scan the group G3. The touch detection method 200 performs step S202 again to perform the touch sensing algorithm A1 on the scan data DG1 to determine whether the touch event occurs on the group G1, to perform the touch sensing algorithm A1 on the scan data DG2 to determine whether the touch event occurs on the group G2 and to perform the touch sensing algorithm A1 on the scan data DG3 to determine whether the touch event occurs on the group G3. Details about the step S201 and the step S202 are already discussed in aforesaid embodiments and not repeated here again.

It is assumed that there is the touch event TE occurs in the touch frame F2. In this case, the microcontroller unit 145 generates another algorithm result ALR (which indicates that the touch event TE is detected) to the touch sense time controller 141. In the meantime, the touch display device 100 and the touch detection method 200 will detect the touch event TE based on one of the scan data DG1~DG3 and acknowledge that the touch event TE occurs on one touch identified group among the groups G1~G3. In response to that the touch event is detected on the touch identified group among the groups G1~G3, the touch detection method 200 performs the step S204, by the microcontroller unit 145 to select a set of fast scan columns FSCL according to the touch identified group. The touch display device 100 and the touch detection method 200 switch from the doze mode into the active mode.

During a fast scan frame FSF as the touch display device 100 and the touch detection method 200 are initially switched into the active mode, the touch detection method 200 performs the step S211 to scan the set of fast scan columns FSCL column-by-column.

Figure 5:
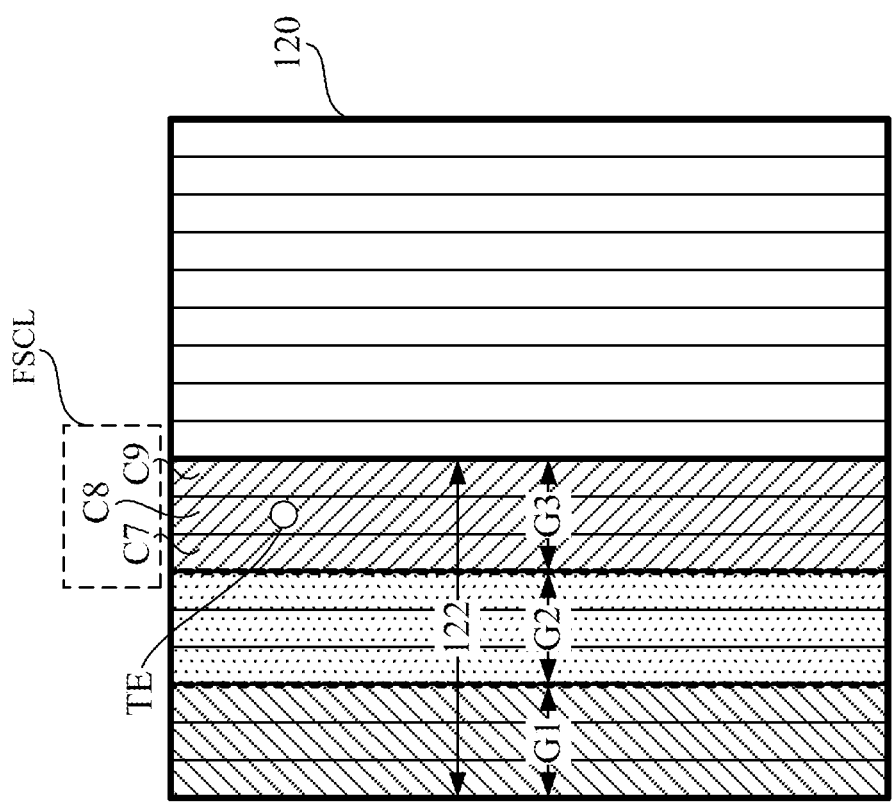
FIG. 5 is a schematic chart diagram illustrating a position of a touch event and a corresponding set of fast scan columns according to a demonstrational example.

Reference is further made to FIG. 5, which is a schematic chart diagram illustrating a position of a touch event TE and a corresponding set of fast scan columns FSCL according to a demonstrational example. As shown in FIG. 5, in the demonstrational example, the touch event TE occurs on the group G3. In this case, the group G3 is detected as the touch identified group. In some embodiments, the columns C7~C9 in the group G3 are selected into the set of fast scan columns FSCL.

As shown in FIG. 1, FIG. 2A, FIG. 3 and FIG. 4, during the touch frame F3 (which is regard as the fast scan frame FSF) in the active mode, the analog front-end controller 143 generates the scan pulse PC7 to the column C7, the scan pulse PC8 to the column C8 and the scan pulse PC9 to the column C9 individually. In the embodiment shown in FIG. 4, these scan pulses PC7~PC9 are generated individually to the columns C7~C9 in the fast scan columns FSCL at an early timing (e.g., the first three pulses of the scan pulses SCP) of the touch frame F3. In this case, the columns C7~C9 in the fast scan columns FSCL can be scanned earlier than other columns.

The analog front-end controller 143 collects the analog sensing signal ASS responsive to the scan pulse PC7 from the column C7, and the analog digital converter 144 converts the analog sensing signal ASS into the scan data DC7, which is related to scan result on the column C7. The analog front-end controller 143 collects the analog sensing signal ASS responsive to the scan pulse PC8 from the column C8, and the analog digital converter 144 converts the analog sensing signal ASS into the scan data DC8, which is related to scan result on the column C8. The analog front-end controller 143 collects the analog sensing signal ASS responsive to the scan pulse PC9 from the column C9, and the analog digital converter 144 converts the analog sensing signal ASS into the scan data DC9, which is related to scan result on the column C9. The touch detection method 200 performs step S212 to perform the touch sensing algorithm A1 on the scan data DC7~DC9 to determine that the touch event TE occurs on which column among the columns C7~C9. In other words, the step S212 is performed to calculate a touch position of the touch event TE according to the scan data DC7~DC9. In the demonstrational example shown in FIG. 5, the touch detection method 200 is able to detect that the touch event TE occurs on the touch event TE on the column C8 according to the scan data DC8. It is noticed that, in some embodiments, the driving circuit 140 may further include analog front-end (AFE) circuits (not shown in figures), which are respectively connected to rows of the touch display panel 120. For example, one AFE circuit can be connected to one of the rows on the touch display panel 120. A row coordinate of the touch event TE can be detected according to voltage levels sensed by the analog front-end circuits on different rows. Combining the column coordinate (e.g., the column C8 in aforesaid embodiments) detected according to the scan data DC7~DC9 by the touch sensing algorithm A1 and the row coordinate detected by the AFE circuits, the touch position of the touch event TE can be detected.

It is noticed that, during the touch frame F3 (i.e., the fast scan frame FSF) in the active mode, the touch display device 100 and the touch detection method 200 scans the columns column-by-column. In addition, in the fast scan frame FSF, the columns C7~C9 in the fast scan columns FSCL are scanned first. In some embodiments, the touch sensing algorithm A1 shown in FIG. 4 is performed by the microcontroller unit 145 immediately after collecting the scan data DC7~DC9 corresponding to the columns C7~C9 in the fast scan columns FSCL. In this case, the microcontroller unit 145 can generate the algorithm result ALR immediately after collecting the scan data DC7~DC9. As shown in FIG. 4, by scanning and performing the touch sensing algorithm A1 upon the columns C7~C9 in the fast scan columns FSCL, the algorithm result ALR (which include the touch position of the touch event TE) can be generated in a first-touch latency FTLat1. The first-touch latency FTLat1 is measured between a starting point of the touch event TE and a finish point of the touch sensing algorithm A1. In other words, the first-touch latency describes the time length the touch display device 100 needs to calculate and identify the touch position of the touch event TE. In a conventional algorithm A2, the algorithm result ALR will be generated at the end of the touch frame F3 (after all scan data corresponding to all columns C1~C9 are collected), such that the algorithm result ALR generated by the conventional algorithm A2 will have a relative longer first touch latency FTLat2. The other first-touch latency FTLat2 is measured between a starting point of the touch event TE and a finish point of the conventional algorithm A2. As shown in FIG. 4, by scanning and performing the touch sensing algorithm A1 upon the columns C7~C9 in the fast scan columns FSCL, the first-touch latency FTLat1 is shorter than the first touch latency FTLat2 by applying the conventional algorithm A2. In other words, scanning and performing the touch sensing algorithm A1 upon the columns C7~C9 in the fast scan columns FSCL can shorten the first touch latency FTLat1.

In this case, once the touch event TE occurs on the touch display panel 120, the touch display device 100 and the touch detection method 200 can react fast in response to the touch event, such as the touch display device 100 can switch from the doze mode into the active mode, and calculate and identify the touch position of the touch event TE within the shorten first touch latency FTLat1.

After the fast scan frame FSF (i.e., the touch frame F3) as the touch detection method 200 is initially switched into the second mode, the touch detection method 200 performs step S213 to scan all columns C1~C9 on the touch display panel 120 column-by-column.

As shown in FIG. 1, FIG. 2A, FIG. 3 and FIG. 4, during the touch frame F4 in the active mode, the analog front-end controller 143 generates the scan pulse PC1 to the column C1, the scan pulse PC2 to the column C2, the scan pulse PC3 to the column C3, the scan pulse PC4 to the column C4, the scan pulse PC5 to the column C5, the scan pulse PC6 to the column C6, the scan pulse PC7 to the column C7, the scan pulse PC8 to the column C8 and the scan pulse PC9 to the column C9 individually. In the embodiment shown in FIG. 4, these scan pulses PC1~PC9 are generated individually to the columns C1~C9 in the touch frame F4.

The analog front-end controller 143 collects the analog sensing signal ASS responsive to the scan pulses PC1~PC9 from the columns C1~C9, and the analog digital converter 144 converts the analog sensing signal ASS into the scan data DC1~DC9, which are related to scan results on the columns C1~C9 respectively.

The touch detection method 200 performs step S214 to perform the touch sensing algorithm A1 by the microcontroller unit 145 on the scan data DC1~DC9 to determine that the touch event TE occurs on which column among the columns C1~C9. In other words, the step S214 is performed to calculate a touch position of the touch event TE according to the scan data DC1~DC9. For example, the touch sensing algorithm A1 can determine that the touch event TE occurs on the column C1 according to the scan data DC1. The touch sensing algorithm A1 can determine that the touch event TE occurs on the column C2 according to the scan data DC2. Therefore, based on the scan data DC1~DC9, the touch sensing algorithm A1 can calculate and identify the touch position of the touch event TE. It is noticed that, in some embodiments, the driving circuit 140 may further include analog front-end (AFE) circuits (not shown in figures), which are respectively connected to rows of the touch display panel 120. For example, one AFE circuit can be connected to one of the rows on the touch display panel 120. A row coordinate of the touch event TE can be detected according to voltage levels sensed by the analog front-end circuits on different rows. Combining the column coordinate detected by the touch sensing algorithm A1 according to the scan data DC1~DC9 and the row coordinate detected by the AFE circuits, the touch position of the touch event TE can be detected.

After step S214, the touch detection method 200 performs step S215 to check whether the touch event TE is detected or not. In this embodiment, because the touch event TE is detected in the touch frame F4, the touch detection method 200 will repeat the steps S213 and S214 for keep tracking the touch position of the touch event TE, and the touch display device 100 will remains in the active mode to scan the columns C1~C9 column-by-column.

Afterward, if the touch event TE keep appearing on the touch display panel 120, the touch display device 100 and the touch detection method 200 will remains in the active mode (e.g., similar to the touch frame F3 as shown in FIG. 4) to track and update the touch position of the touch event TE in every touch frames. The touch display device 100 and the touch detection method 200 in the active mode can dynamically track the touch position of the touch event TE in real time with a relatively higher power consumption.

On the other hand, when the touch event TE no longer occurs on the touch display panel 120, the touch sensing algorithm A1 performed in the step S214 will not find any touch event. The touch detection method 200 performs step S216 to determine if there is no touch event over a threshold time period (e.g., the threshold time period can be set at 1 second or 3 seconds). If there is no touch event over the threshold time period, the touch detection method 200 switches the touch display device 100 from the active mode into the doze mode (e.g., similar to the touch frames F1 and F2 as shown in FIG. 4).

It is noticed that, in aforesaid demonstrational example shown in FIG. 4 and FIG. 5, the touch event TE occurs on the group G3. In this embodiment, only the columns C7~C9 in the group G3 are selected into the set of fast scan columns FSCL. However, the disclosure is not limited thereto.

In practical applications, a touch position of the touch event TE may change very fast. In the embodiments shown in FIG. 4 and FIG. 5, the touch event TE is detected on the group G3 in the touch frame F2, such that the touch display device 100 and the touch detection method 200 scan the columns C7~C9 in the group G3 in the following touch frame F3. However, there is possibility that the touch event TE may move away from the group G3 to an adjacent group, such that the touch event TE cannot be tracked in the touch frame F3 according to the embodiments shown in FIG. 4 and FIG. 5. It may lose track of the touch event TE if the touch event TE moves relatively fast during the touch frames F2 and F3.

Figure 6:
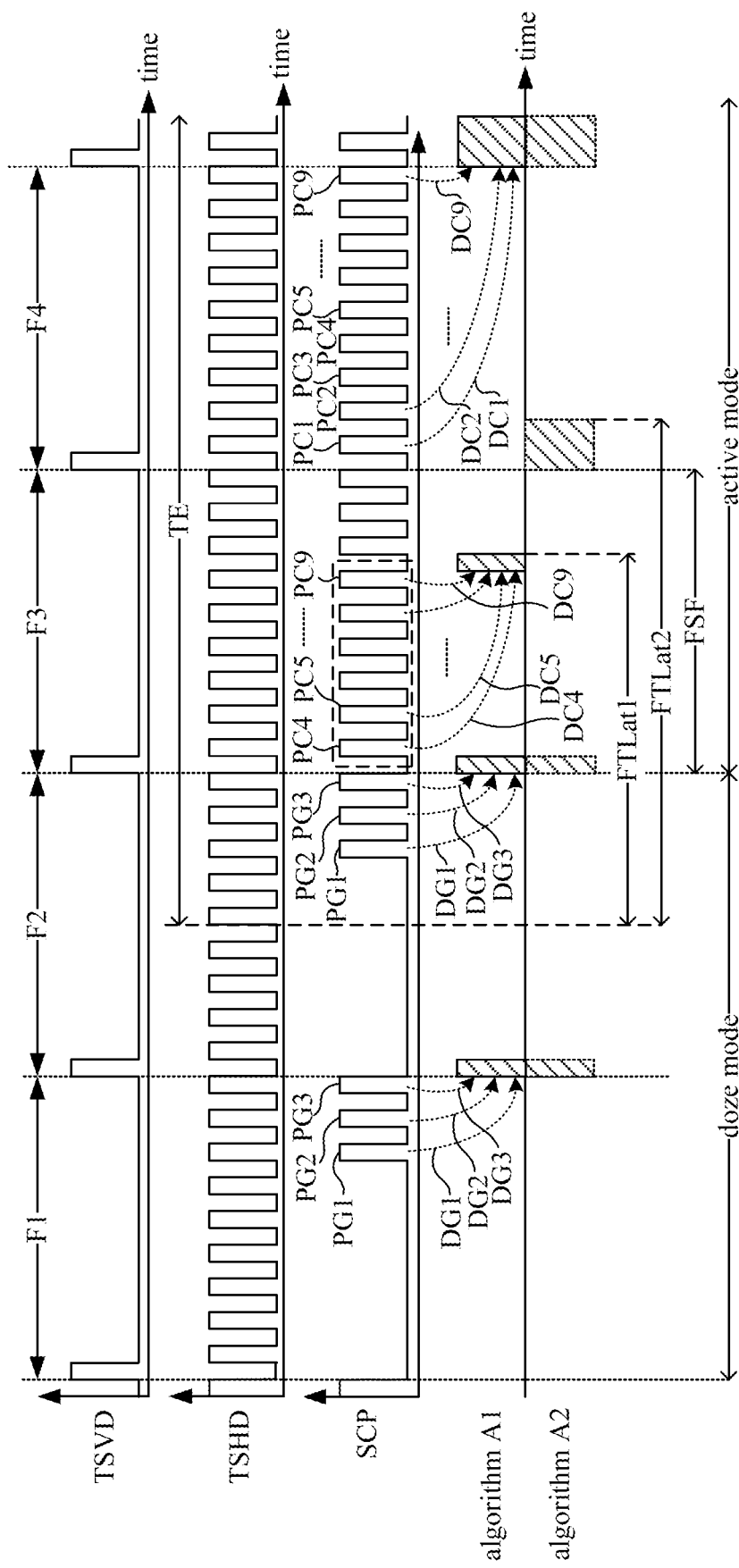
FIG. 6 is a signal waveform diagram illustrating related signals of the touch display device while performing the touch detection method according to another demonstrational example.

Reference is further made to FIG. 6 and FIG. 7. FIG. 6 is a signal waveform diagram illustrating related signals of the touch display device 100 while performing the touch detection method 200. FIG. 7 is a schematic chart diagram illustrating a position of a touch event TE and a corresponding set of fast scan columns FSCL according to another demonstrational example. As shown in FIG. 7, in the demonstrational example, the touch event TE occurs on the group G3. In this case, the group G3 is detected as the touch identified group. In the embodiments shown in FIG. 6 and FIG. 7, the columns C7~C9 in the group G3 are selected into the set of fast scan columns FSCL. In addition to the columns C7~C9 in the group G3, corresponding columns C4~C6 in an adjacent group (i.e., the group G2) around the touch identified group (i.e., the group G3) are also selected into the set of fast scan columns FSCL. In the embodiments shown in FIG. 6 and FIG. 7, the set of fast scan columns FSCL includes the columns C4~C9 which cover the touch group (i.e., the group G3) and the adjacent group (i.e., the group G2) around the touch group. In this case, it can avoid the risk about losing track of the touch event TE. Even when the event TE moves relatively during the touch frames F2 and F3, the touch display device 100 and the touch detection method 200 have a better chance to keep tracking the touch event in the touch frame F3.

It is noticed that, during the touch frame F3 (i.e., the fast scan frame FSF) in the active mode as shown in FIG. 1, FIG. 3 and FIG. 6, the touch display device 100 and the touch detection method 200 scans the columns column-by-column. In addition, in the fast scan frame FSF, the columns C4~C9 in the fast scan columns FSCL are scanned first. In some embodiments, the touch sensing algorithm A1 shown in FIG. 6 is performed by the microcontroller unit 145 immediately after collecting the scan data DC4~DC9 corresponding to the columns C4~C9 in the fast scan columns FSCL. In this case, the microcontroller unit 145 can generate the algorithm result ALR immediately after collecting the scan data DC4~DC9. As shown in FIG. 6, by scanning and performing the touch sensing algorithm A1 upon the columns C4~C9 in the fast scan columns FSCL, the algorithm result ALR (which include the touch position of the touch event TE) can be generated in a first-touch latency FTLat1. In a conventional algorithm A2, the algorithm result ALR will be generated at the end of the touch frame F3 (after all scan data corresponding to all columns C1~C9 are collected), such that the algorithm result ALR generated by the conventional algorithm A2 will have a relative longer first touch latency FTLat2. As shown in FIG. 6, by scanning and performing the touch sensing algorithm A1 upon the columns C4~C9 in the fast scan columns FSCL, the first-touch latency FTLat1 is shorter than the first touch latency FTLat2 by applying the conventional algorithm A2.

It is noticed that, the fast scan columns FSCL scanned in the touch frame F3 include the columns C4~C6 in the touch identified group detected in the touch frame F2 and also the columns C7~C9 in one adjacent group next to the touch identified group. In this case, the scanning in the touch frame F3 has a better chance to track the touch event TE.

It is noticed that, in the embodiments shown in FIG. 2, for brevity, the columns on the touch display panel 120 are divided into three groups G1~G3. In practical applications, the touch display panel 120 may include much more columns (e.g., 240 columns) divided into more groups (e.g., divided into 30 groups). In some embodiments, the touch group and adjacent groups on both sides of the touch group can be selected into the set of fast scan columns FSCL.

Based on aforesaid embodiments, the touch detection method 200 can reduce the power consumption of the touch display device 100 in the doze mode (while no touch event occurring to the touch display panel 120), and also the touch display device 100 and the touch detection method 200 can react fast when the touch event TE occurs. The touch display device 100 and the touch detection method 200 can switch into the active mode, and scan the set of fast scan columns FSCL during the fast scan frame FSF, so as to reduce the first touch latency. In this case, the touch display device 100 can have a better performance (e.g., the shorter first touch latency) and a lower power consumption (e.g., during the doze mode).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch detection method, suitable for a touch display panel comprising a plurality of sensing pads, the touch detection method comprising:
    in a first mode, scanning the sensing pads group-by-group for detecting whether a touch event occurs on a touch identified group, wherein the sensing pads are divided into a plurality of groups and each group comprises at least two columns of the sensing pads, wherein each of the groups comprises K columns of the sensing pads, K is a positive integer larger than or equal to 2, the step of scanning the sensing pads group-by-group comprises:
        generating a first scan pulse simultaneously to K columns of the sensing pads in a first group and collecting a first scan data responsive to the first scan pulse simultaneously from the K columns of the sensing pads in the first group; and
        generating a second scan pulse simultaneously to K columns of the sensing pads in a second group and collecting a second scan data responsive to the second scan pulse from the K columns of the sensing pads in the second group; and
    in response to the touch identified group being detected in the first mode by scanning group-by-group, in a second mode, scanning the sensing pads on the touch identified group column-by-column to identify a touch position of the touch event.

2. The touch detection method according to claim 1, wherein in response to that the touch event is detected on the touch identified group, the touch detection method further comprises:
    selecting a set of fast scan columns according to the touch identified group;
    switching the touch detection method from the first mode into the second mode; and
    during a first touch frame as the touch detection method is initially switched into the second mode, scanning the set of fast scan columns column-by-column.

3. The touch detection method according to claim 2, wherein the touch detection method further comprises:
    after the first touch frame in the second mode of the touch display panel, scanning all of the sensing pads on the touch display panel column-by-column.

4. The touch detection method according to claim 3, wherein, in the second mode of the touch display panel, the touch detection method further comprises:
    in response to that no touch event is detected on any column of the sensing pads over a threshold time period, switching the touch display panel from the second mode into the first mode.

5. The touch detection method according to claim 2, wherein in response to that the touch event is detected on the touch identified group, corresponding columns in the touch identified group are selected as the set of fast scan columns.

6. The touch detection method according to claim 2, wherein in response to that the touch event is detected on the touch identified group, corresponding columns in the touch identified group and corresponding columns in an adjacent group around the touch identified group are selected as the set of fast scan columns.

7. The touch detection method according to claim 1, wherein a touch sensing algorithm is performed on the first scan data to detect whether the touch event occurs on the first group, the touch sensing algorithm is performed on the second scan data to detect whether the touch event occurs on the second group.

8. The touch detection method according to claim 1, wherein the step of scanning the columns column-by-column comprises:
    generating a third scan pulse to a first column of the sensing pads on the touch display panel and collecting a third scan data responsive to the third scan pulse from the first column of the sensing pads; and generating a fourth scan pulse to a second column of the sensing pads on the touch display panel and collecting a fourth scan data responsive to the fourth scan pulse from the second column of the sensing pads.

9. The touch detection method according to claim 8, wherein a touch sensing algorithm is performed on the third scan data to detect whether the touch event occurs on the first column, the touch sensing algorithm is performed on the fourth scan data to detect whether the touch event occurs on the second column.

10. A touch display device, comprising:
a touch display panel comprising a plurality of sensing pads arranged on a plurality of columns, wherein the sensing pads are divided into a plurality of groups and each of the groups comprises at least two of the columns of the sensing pads;
a driving circuit, coupled with the touch display panel, wherein:
in a first mode, the driving circuit is configured to scan the sensing pads group-by-group for detecting whether a touch event occurs on a touch identified group, and
in response to the touch identified group being detected in the first mode by scanning group-by-group, in a second mode, the driving circuit is configured to scan the sensing pads column-by-column to identify a touch position of the touch event,
wherein the driving circuit comprises:
an analog front-end controller coupled with the columns of the sensing pads on the touch display panel, wherein the analog front-end controller is configured to generate a plurality of scan pulses to the columns of the sensing pads and collect a plurality of analog sensing signals corresponding to the scan pulses;
an analog digital converter coupled with the analog front-end controller, wherein the analog digital converter is configured to convert the analog sensing signals into a plurality of scan data; and
a microcontroller unit coupled with the analog digital converter, wherein the microcontroller unit is configured to detect the touch event according to the scan data and calculate the touch position of the touch event according to the scan data;
wherein each of the groups comprises K columns of the sensing pads, K is a positive integer larger than or equal to 2, the driving circuit scans the sensing pads group-by-group by:
generating a first scan pulse by the analog front-end controller simultaneously to K columns of the sensing pads in a first group, collecting a first analog sensing signal by the analog front-end controller responsive to the first scan pulse simultaneously from the K columns of the sensing pads in the first group, and converting the first analog sensing signal into a first scan data by the analog digital converter; and
generating a second scan pulse by the analog front-end controller to simultaneously K columns of the sensing pads in a second group, collecting a second analog sensing signal by the analog front-end controller responsive to the second scan pulse from the K columns of the sensing pads in the second group, and converting the second analog sensing signal into a second scan data by the analog digital converter.

11. The touch display device according to claim 10, wherein the driving circuit comprises:
a display driver; and
a touch sense time controller coupled with the display driver, wherein the touch sense time controller is configured to receive a frame synchronization signal and a horizontal synchronization signal from the display driver, the touch sense time controller is configured to trigger the analog front-end controller to generate the scan pulses in reference with the frame synchronization signal and the horizontal synchronization signal.

12. The touch display device according to claim 11, wherein the driving circuit is a touch-and-display driver integration (TDDI) circuit.

13. The touch display device according to claim 10, wherein in response to that the touch event is detected by the microcontroller unit according to the scan data on the touch identified group, the microcontroller unit selects a set of fast scan columns according to the touch identified group, the driving circuit switches from the first mode into the second mode,
during a first touch frame as the driving circuit is initially switched into the second mode, the driving circuit scans the set of fast scan columns column-by-column.

14. The touch display device according to claim 13, wherein after the first touch frame in the second mode of the touch display panel, the driving circuit scans all of the columns of the sensing pads column-by-column.

15. The touch display device according to claim 13, wherein in response to that the touch event is detected on the touch identified group, corresponding columns in the touch identified group are selected as the set of fast scan columns, or the corresponding columns in the touch identified group and corresponding columns in an adjacent group around the touch identified group are selected as the set of fast scan columns.

16. The touch display device according to claim 10, wherein a touch sensing algorithm is performed by the microcontroller unit on the first scan data to detect whether the touch event occurs on the first group, the touch sensing algorithm is performed on the second scan data to detect whether the touch event occurs on the second group.

17. The touch display device according to claim 10, wherein the driving circuit scans the sensing pads column-by-column by:
generating a third scan pulse by the analog front-end controller to a first column of the sensing pads on the touch display panel, collecting a third analog sensing signal by the analog front-end controller responsive to the third scan pulse from the first column, and converting the third analog sensing signal into a third scan data; and
generating a fourth scan pulse to a second column of the sensing pads on the touch display panel, collecting a fourth analog sensing signal responsive to the fourth scan pulse from the second column, and converting the fourth analog sensing signal into a fourth scan data.

* * * * *